United States Patent Office 2,861,898
Patented Nov. 25, 1958

2,861,898
NOVEL COATED PARTICULATE FOAMABLE STYRENE POLYMER COMPOSITIONS

Norbert Platzer, Springfield, Mass., assignor to Monsanto Chemical Company, St. Louis, Mo., a corporation of Delaware No Drawing. Application September 10, 1956
Serial No. 608,689

5 Claims. (Cl. 117—100)

The present invention relates to coated particulate foamable styrene polymer compositions and to a method for preparing same. More particularly, the invention relates to coated particulate foamable styrene polymer compositions which are particularly adapted to be employed in the fabrication of styrene polymer foams by extrusion processes.

Styrene polymer foams constitute a valuable class of materials which are finding increasingly wide application in the fabrication of numerous industrial and consumer articles. A widely used method for fabricating such styrene polymer foams comprises extruding particulate foamable styrene polymer compositions through screw-type extruders. When styrene polymer foams are prepared by such extrusion processes, it is difficult to obtain foams in which the cells are uniform in size and which cells have an average diameter of less than about 0.05 inch. Styrene polymer foams containing cells of this size are brittle and the fragile nature of the extruded products limits their acceptance in the art.

The copending applications of Frank A. Carlson, Jr., and Norbert Platzer, Serial No. 598,517, filed July 18, 1956, and Serial No. 602,450, filed August 6, 1956, disclose that extruded styrene polymer foams of fine pore size can be obtained by incorporating either a water-insoluble alkaline earth metal silicate or a water-insoluble aluminum silicate in the foamable styrene polymer composition before extruding same. Such water-insoluble silicate containing foamable styrene polymer compositions can be prepared by dry-blending the particulate foamable styrene polymer compositions and the water-insoluble silicates to form physical admixtures thereof. This procedure gives satisfactory results when the admixtures of particulate foamable styrene polymer composition and water-insoluble silicate are extruded shortly after the preparation of the admixture. However, when such physical admixtures are stored, shipped, and/or handled extensively before use, it is observed that the particulate foamable styrene polymer compositions and the water-insoluble silicates tend to segregate with the fine particles of water-insoluble silicate tending to flow to the bottom of the containers in which the admixtures are stored. As a result, when such segregated batches of the admixtures are extruded, they may contain an insufficient quantity of the water-insoluble silicate to provide the desired fine pore size in the extruded styrene polymer foam.

It is an object of this invention to provide particulate foamable styrene polymer compositions which contain water-insoluble alkaline earth metal silicates or water-insoluble aluminum silicates and which do not segregate upon standing.

Another object of this invention is to provide a process for preparing particulate foamable styrene polymer compositions which contain water-insoluble alkaline earth metal silicates or water-insoluble aluminum silicates and which do not segregate upon standing.

Other objects and advantages of this invention will be apparent from the following detailed description thereof.

It has been discovered that particulate foamable styrene polymer compositions having a water-insoluble alkaline earth metal silicate or a water-insoluble aluminum silicate associated therewith can be prepared readily by separately coating a particulate foamable styrene polymer composition with both (a) a water solution of an alkaline earth metal salt or an aluminum salt and (b) a water-soluble silicate salt. The alkaline earth metal ions or aluminum ions react with the silicate ions on the surface of the polymer particles and form a water-insoluble silicate in situ. Most surprisingly, the water-insoluble silicate formed in situ on the polymer particles clings tenaciously thereto and does not segregate on standing.

The following examples are set forth to illustrate more clearly the principle and practice of this invention to those skilled in the art. All parts are by weight.

EXAMPLE I

Part A

Five pounds of polystyrene beads of 20–40 mesh particle size and containing 6% pentane incorporated therein are blended first with an aqueous solution containing 20 grams of calcium chloride and secondly with 88 grams of a 36% aqueous sodium silicate solution. Finally, the polymer beads are washed with a large excess of water to remove soluble salts from the beads and then air-dried. The polymer beads have 1% calcium silicate deposited on their surfaces and can be extruded at a temperature at 325° F. to obtain a styrene polymer foam having a density of 4 lbs. per cubic foot and a uniform cell size having an average diameter of about 0.02 inch.

Part B

A 100 gram aliquot of the calcium silicate coated foamable styrene polymer beads prepared in Part A are shaken for 5 minutes on a 100 mesh screen with no loss of calcium silicate. In contrast to these results, when a uniform physical admixture of 99 parts of the foamable styrene polymer beads employed in Part A and 1 part of 1 micron size calcium silicate pigment is shaken for 5 minutes on the same 100 mesh screen, approximately 50% of the calcium silicate is lost from the physical admixture.

EXAMPLE II

Magnesium silicate coated foamable styrene polymer beads are prepared in precisely the same manner as described in Example I, Part A, except that the calcium chloride is replaced with a stoichiometrically equivalent quantity of magnesium chloride. Substantially none of the magnesium silicate is removed from the polymer beads when they are shaken for 5 minutes on a 100 mesh screen as described in Example I, Part B.

EXAMPLE III

Aluminum silicate coated foamable styrene polymer beads are prepared in precisely the same manner as described in Example I, Part A, except that the calcium chloride is replaced with a stoichiometrically equivalent quantity of aluminum sulfate. Substantially none of the aluminum silicate is removed from the coated beads when they are shaken for 5 minutes on a 100 mesh screen as described in Example I, Part B.

The compositions of this invention are particulate foamable styrene polymer compositions which have deposited on their surfaces a water-insoluble alkaline earth metal silicate or a water-insoluble aluminum silicate. The quantity of water-insoluble silicate included in the compositions constitutes 0.1–5.0 weight percent and preferably 0.2–2.0 weight percent of the total composition.

The water-insoluble silicate is deposited on the surface of the polymer particles by sequentially coating the polymer particles with (a) an aqueous solution of an alkaline earth metal salt or an aluminum salt and (b) a water solution of a silicate salt. The particular water-soluble alkaline earth metal salts, water-soluble aluminum salts and water-soluble silicate salts employed are immaterial providing only that the salts employed contain no ions which interfere with the metathetical reaction between the alkaline earth metal ion or aluminum ion and the silicate ion. Similarly, the particular order in which the particulate foamable styrene polymer particles are coated with the two classes of water-soluble salts is immaterial.

The above described method of depositing the water-insoluble alkaline earth metal silicate or water-insoluble aluminum silicate on the polymer particles also forms a second inorganic compound on the polymer particles. The coformed inorganic salt is usually water-soluble and, if desired, may be removed by washing the polymer particles with water.

The particulate foamable styrene polymer compositions on which the water-insoluble silicates are deposited comprises a styrene polymer having incorporated therein as a foaming agent a volatile organic compound which has a boiling point below the softening point of the styrene polymer employed.

The styrene polymers which may be employed in the compositions of the invention are homopolymers of styrene and interpolymers of styrene containing a predominant proportion of styrene, i. e., greater than 50 weight percent and preferably greater than 75 weight percent styrene. Examples of monomers that may be interpolymerized with the styrene include the conjugated 1,3-dienes, e. g., butadiene, isoprene, etc., alpha, beta-unsaturated monocarboxylic acids and derivatives thereof, e. g., acrylic acid, methyl acrylate, ethyl acrylate, butyl acrylate, 2-ethylhexyl acrylate, and the corresponding esters of methacrylic acid, acrylamide, methacrylamide, acrylonitrile, methacrylonitrile, divinyl benzene, etc. If desired, blends of the styrene polymer with other polymers may be employed, e. g., blends of the styrene polymer with rubbery diene polymer or the analogous compositions obtained by dissolving a rubbery diene polymer in the styrene monomer and subsequently polymerizing the mixture. In any of the above type resins, all or a portion of the styrene may be replaced with its closely related homologues such as alpha-methylstyrene, o-, m-, and p-methylstyrenes, o-, m-, and p-ethylstyrenes, 2,4-dimethylstyrene, etc. In general, the styrene polymers employed should have a molecular weight in the range of about 40,000–80,000 (as determined by the Staudinger method).

The foaming agent included in the compositions of the invention may be any organic compound which boils below the softening point of the styrene polymer and which can be incorporated substantially homogeneously therethrough. Preferably, although not mandatorily, the foaming agent should have little or no solvent action on the styrene polymer. Suitable examples of such foaming agents include acetone, methyl alcohol, methyl acetate, ethyl acetate, methyl formate, ethyl formate, dichloroethylene, isopropylchloride, propionaldehyde and dipropyl ether. Other examples of suitable foaming agents include methyl chloride, dichloroethane, dichlorodifluoromethane and other low boiling chlorofluoroalkanes. An especially preferred class of foaming agents consists of aliphatic hydrocarbons boiling within the range of about 10° C. to about 80° C., e. g., pentane, hexane, heptane, cyclopentane, cyclopentadiene and petroleum ethers boiling within the indicated temperature range. If desired, mixtures of two or more foaming agents may be employed.

The particulate foamable styrene polymers employed may also include plasticizers, lubricants, stabilizers, colorants and other conventional plastic compounding ingredients.

The compositions provided by the present invention can be extruded by conventional techniques. For example, the extrusion operation may be carried out in continuous screw-type extruders at temperatures ranging from about 250° F. to about 400° F., depending upon the softening temperature of the styrene polymer employed. The most uniform material is obtained at temperatures of 300–325° F. The material may be extruded through dies of any desired configuration into open or closed molds or into the open air. The pressure of the die should be greater than about 150 p. s. i. to prevent foaming within the die. The extrusion rates obtainable under any given set of extrusion conditions are substantially equivalent to those obtained with corresponding foamable styrene polymer compositions which do not contain alkaline earth metal silicates or aluminum silicates.

The above descriptions and particularly the examples are set forth by way of illustration only. Many other variations and modifications thereof will be apparent to those skilled in the art and can be made without departing from the spirit and scope of the invention herein described.

What is claimed is:

1. The method for preparing a particulate foamable styrene polymer composition having incorporated therein a volatile organic compound as a foaming agent and having deposited on the surface thereof a material of the group consisting of water-insoluble alkaline earth metal silicates, water-insoluble aluminum silicates and mixtures thereof which comprises sequentially coating a particulate foamable styrene polymer with (a) a water solution of a material of the group consisting of alkaline earth metal salts, aluminum salts and mixtures thereof and (b) a water solution of a silicate salt, the quantity of said water-soluble salts coated on the particulate styrene polymer being sufficient to deposit upon the polymer particles 0.1–5.0 weight percent of water-insoluble silicate compound.

2. The method of claim 1 in which the particulate styrene polymer is sequentially coated with a water solution of a calcium salt and a water solution of a silicate salt.

3. The method of claim 1 in which the particulate styrene polymer is sequentially coated with a water solution of a magnesium salt and a water solution of a silicate salt.

4. The method of claim 1 in which the particulate styrene polymer is sequentially coated with a water solution of an aluminum salt and a water solution of a silicate salt.

5. A coated particulate foamable styrene polymer prepared by the method of claim 1.

References Cited in the file of this patent

UNITED STATES PATENTS

| | | |
|---|---|---|
| 1,421,888 | Allen | July 4, 1922 |
| 1,876,629 | Denning | Sept. 13, 1932 |